United States Patent
Ohki et al.

(10) Patent No.: US 6,644,553 B1
(45) Date of Patent: Nov. 11, 2003

(54) PORTABLE IC CARD TERMINAL

(75) Inventors: Masaru Ohki, Tokorozawa (JP); Takahiro Sakaguchi, Akishima (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/508,175

(22) PCT Filed: Oct. 3, 1997

(86) PCT No.: PCT/JP97/03548
§ 371 (c)(1),
(2), (4) Date: May 31, 2000

(87) PCT Pub. No.: WO99/18538
PCT Pub. Date: Apr. 15, 1999

(51) Int. Cl.[7] .............................................. G06K 19/06
(52) U.S. Cl. ....................................... 235/492; 235/380
(58) Field of Search ................................. 235/380, 381, 235/382, 492; 902/1, 2, 4, 25; 705/43

(56) References Cited

U.S. PATENT DOCUMENTS 5,844,218 A * 12/1998 Kawan et al. ............... 235/375
5,923,884 A * 7/1999 Peyret et al. ................ 235/382
6,089,456 A * 7/2000 Walsh et al.
6,223,984 B1 * 5/2001 Renner et al. ............... 235/380

FOREIGN PATENT DOCUMENTS

| JP | 62-274465 | | 11/1987 |
| JP | 63-298588 | | 12/1988 |
| JP | 1-220925 | | 9/1989 |
| JP | 04-216189 | * | 6/1992 |
| JP | 5-012511 | | 1/1993 |
| JP | 6-290312 | | 10/1994 |
| JP | 7-239921 | | 9/1995 |
| JP | 9-091236 | | 4/1997 |
| WO | 97/05582 | * | 2/1997 |

* cited by examiner

Primary Examiner—Diane I. Lee
(74) Attorney, Agent, or Firm—Mattingly, Stanger & Malur, P.C.

(57) ABSTRACT

An IC card terminal is provided which facilitates the maintenance including the registration, confirmation and erasure of an application and parameters in the case where a plurality of applications can be mounted on an IC card. A memory space (90) of the IC card terminal can store an IC card terminal application (82, 83) supplied through an outside network and an IC card application (91, 92) corresponding to the IC card terminal application supplied.

5 Claims, 13 Drawing Sheets

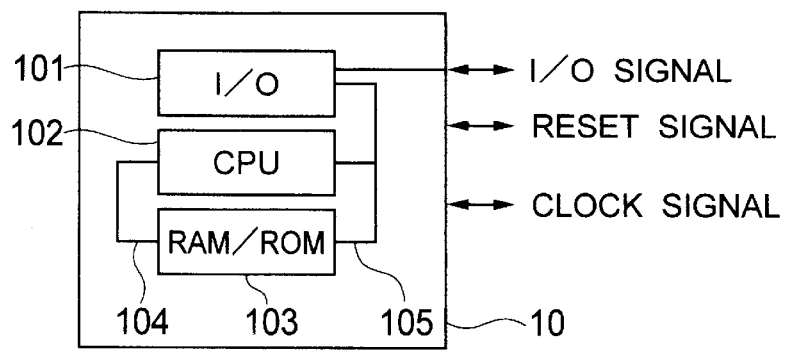
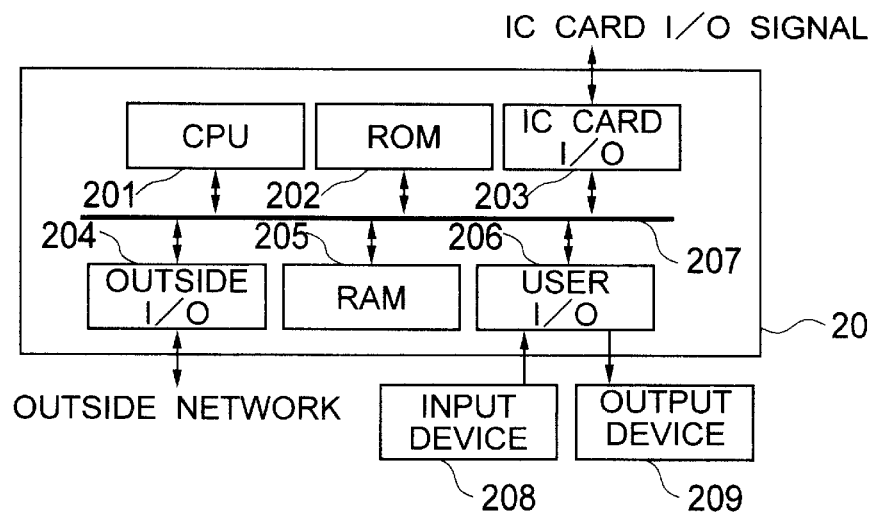
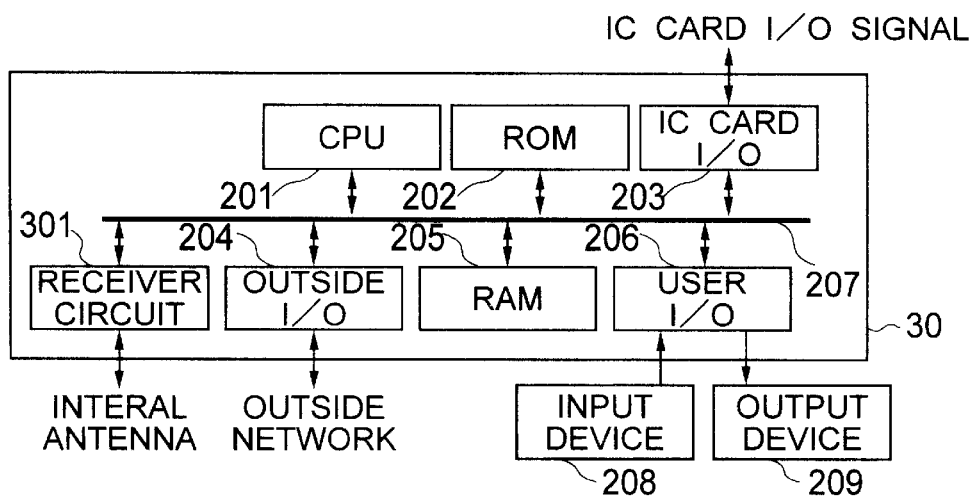

1. EXECUTION OF APPLICATION
   (INCLUDING AUTO VERSION-UP)
2. VERSION-UP OF APPLICATION
3. MAINTENANCE OF APPLICATION
4. RETURN TO PREVIOUS SCREEN
5. END

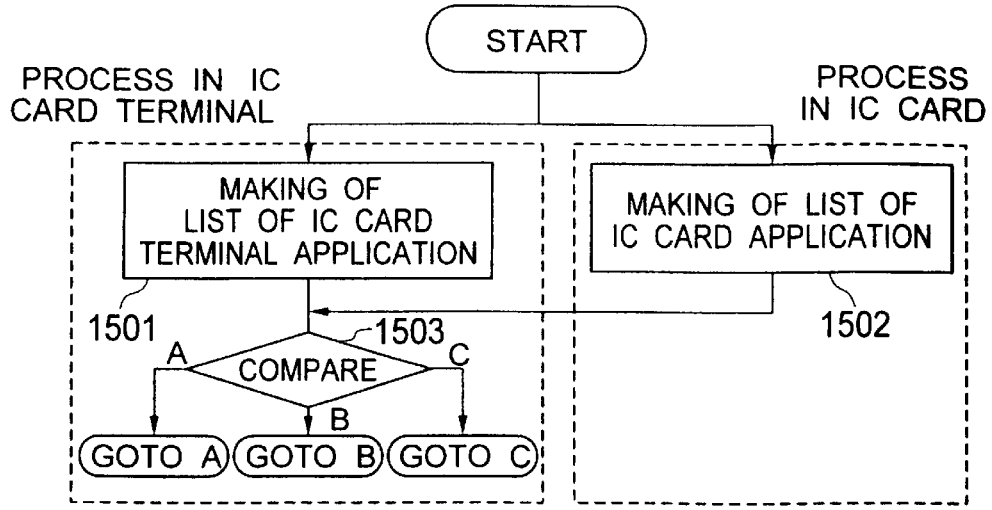
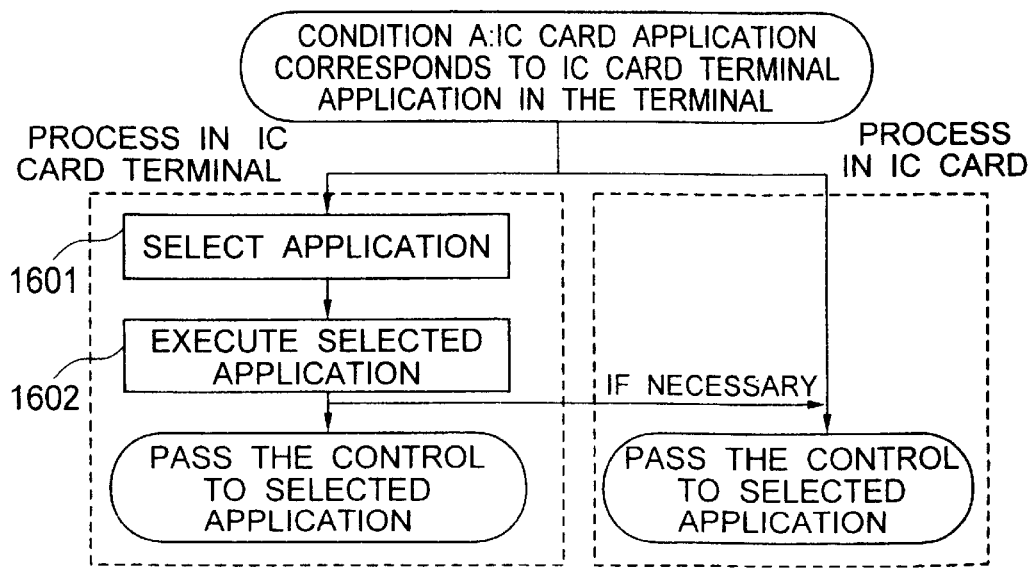

PORTABLE IC CARD TERMINAL

TECHNICAL FIELD

The present invention relates to a compact, lightweight portable IC card terminal, which can be utilized in the field of electronic money eliminating the need of carrying cash and having a safety excluding the use by third parties, and the field of the electronic commercial transactions including cashless shopping, on-line shopping and home banking.

BACKGROUND ART

Electronic money is available as a safe method of electronically settling an account small in amount for purchase of such items as daily goods. In this method, electronic data (also called "the electronic money") having a value as high as cash is stored in an IC card thereby to realize the same immediate account settlement as if paid in cash. In the case where the IC card is used in this way, unlike the conventional credit card or the member card, there occurs the desire on the part of the card user to refer to the contents of the IC card as required. A technique meeting such a need of a portable IC card terminal is introduced in the book "Electronic Money" edited by Hitachi, Ltd. and published by Nikkan Kogyo Shimbun, as a device including a balance reader or an electronic wallet capable of checking the balance of the electronic money or delivering the electronic money between individual persons. The balance reader is a display unit capable of checking the balance in the IC card inserted thereinto. The electronic wallet, on the other hand, is a device capable of displaying the balance in the IC card and capable of delivering money between IC cards inserted thereinto at the same time. These devices, which are portable IC card terminals capable of reading and processing the information from the IC card, has a limited function applicable only to specific type of application.

The balance reader and the electronic wallet, though high in portability, can find practical applications only in specific fields (electronic money application in the case under consideration). In the future, however, it is expected that a plurality of applications will come to be stored in the IC card. For example, applications for various services such as the working management and the health insurance certificate may come to be stored in a single IC card. The prior art cited above fails to take into account a portable IC card terminal meeting the need of the IC card having a plurality of applications stored therein.

FIGS. 22 and 23 show memory spaces 220, 230 of a conventional IC card and a conventional IC card terminal. These memory spaces have stored therein an IC card application 222 and an IC card terminal application 232 meeting the requirement for the services supplied by the IC card. The application 222 and the terminal application 232 have a supplementary relation and concurrently operate, making it possible to supply the services. The memory space of the IC card (IC card terminal) presupposing such a single application is occupied by a device driver unit 221 (231) and a single application 222 (232). The device driver unit 221 (231) provides a microprogram interface for executing the application 222 (232) with hardware (IC card or IC card terminal). The hardware, the device driver unit and the application are correlated so closely that even in the presence of a free space, another application cannot be stored and executed.

The present invention provides a portable IC card terminal meeting the requirement of the IC card having a plurality of applications stored therein. Especially in the case where a plurality of applications are stored in an IC card, unlike in the case where a single application is stored therein as in the prior art, the problem is posed that the maintenance including the registration, confirmation and erasure of the application on the IC card is difficult.

DISCLOSURE OF THE INVENTION

There is provided an IC card terminal comprising a memory for storing an IC card terminal application corresponding to the IC card application stored in an IC card, a CPU for executing the IC card terminal application, and an I/O connectable to an outside network, in which the IC card terminal application supplied through the outside network and the IC card application corresponding to the IC card terminal application thus supplied can be stored in the memory.

BRIEF DESCRIPTION OF THE DRAWINGS

FIG. 1 is a diagram showing a configuration of an IC card chip.

FIG. 2 is a diagram showing a configuration of an IC card terminal according to a first embodiment of the invention.

FIG. 3 is a diagram showing a configuration of an IC card terminal according to a second embodiment of the invention.

FIG. 15 is a diagram showing the flow of a preliminary process for the process of executing an application in an IC card terminal according to the invention.

FIG. 16 is a diagram showing the flow of a process (condition A) of executing an application in an IC card terminal according to the invention.

BEST MODE FOR CARRYING OUT THE INVENTION

Figure 4:
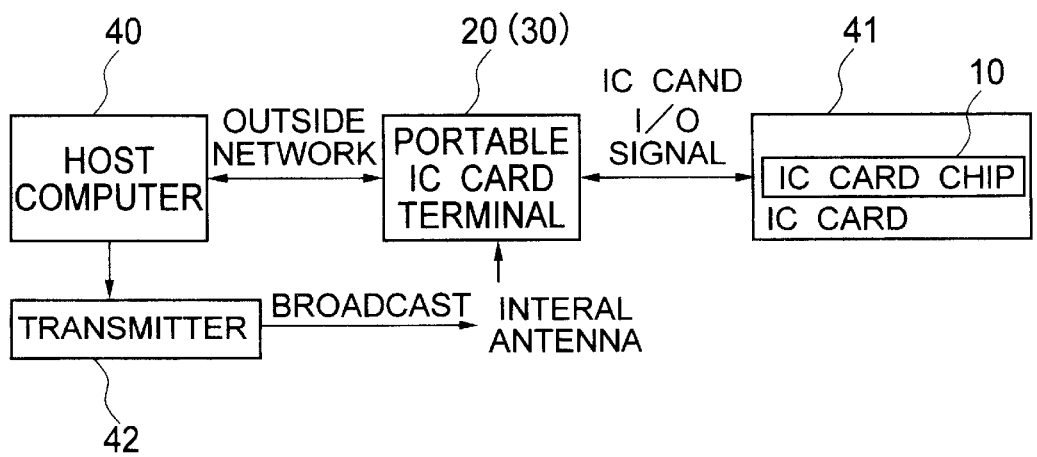
FIG. 4 is a diagram showing a system environment (the basic relation between the IC card, the IC card terminal and the host computer) according to the invention.

FIG. 1 is a diagram showing a general configuration of an IC card chip 10 built-in in an IC card for an IC card terminal according to the present invention. The IC card chip 10 is configured with a CPU 102 for executing an application, a RAM/ROM 103 for storing applications and data to be executed, an I/O 101 for establishing communication with an IC card terminal, an address bus 104 for connecting the CPU 102 and the RAM/ROM 103, and a control signal/data signal bus 105 for connecting the CPU 102, the RAM/ROM 103 and the I/O 101. The IC card chip 10 is activated upon receipt of a reset signal and a clock signal from outside and exchanges signals through the I/O terminal.

FIG. 2 is a diagram showing a configuration of a portable IC card terminal according to a first embodiment of the invention. The IC card terminal 20 comprises a CPU 201 for executing an application, a RAM 205 for storing an application and data to be executed, a ROM 202 for initial booting, a user I/O 206 for controlling an input device 208 such as a ten-keys and an output device 209 such as a liquid crystal display or a speaker, an IC card I/O 203 for exchanging information with the IC card, and an outside I/O 204 for exchanging information with an outside network. These component elements are interconnected by a bus 207. Though not shown, other outside memories such as a large-capacity storage unit may be included. The large capacity storage unit has stored therein, like the RAM 205, applications and data.

FIG. 3 is a diagram showing a configuration of the portable IC card terminal 30 according to a second embodiment of the invention. The portable IC card terminal 30 comprises, in addition to the configuration of the first embodiment, a receiving circuit 301 for receiving information from an internal antenna. The operation specific to the IC card terminal 30 will be explained in detail with reference to FIG. 20.

With reference to FIG. 4, the system environment in which the portable IC card terminal 20 (30) is used will be explained. The portable IC card terminal 20 (30) is connected, via an IC card I/O signal, to the IC card 41 having the IC card chip 10 built-in therein. Also, as required by the IC card user, an outside I/O terminal of the portable IC card terminal 20 (30) maybe connected to an outside network, through which information is exchanged with a host computer 40. The portable IC card terminal 30 receives, by way of an internal antenna, the information broadcast through a transmitter 42 from the host computer 40.

Figure 5:
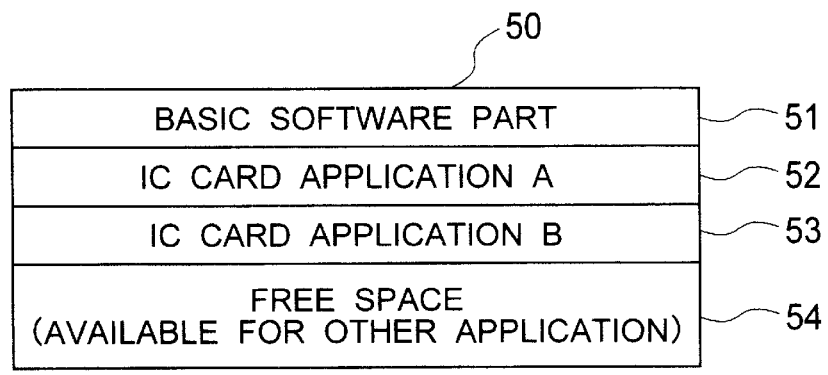
FIG. 5 is a diagram showing a configuration of the IC card memory space with a plurality of IC card applications stored therein.
Figure 6:
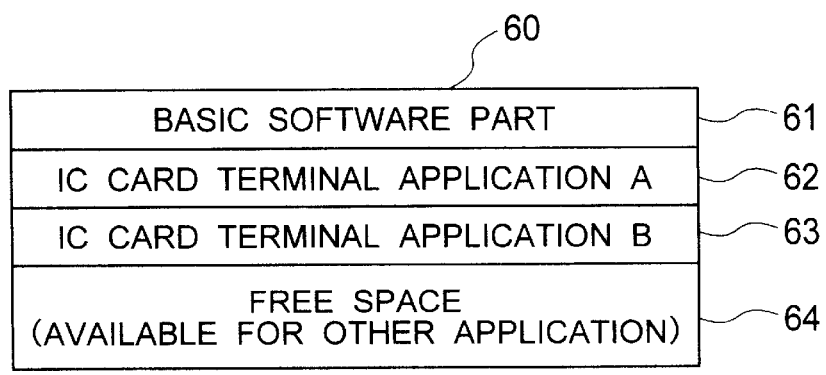
FIG. 6 is a diagram showing a configuration of the IC card terminal memory space with a plurality of IC card terminal applications stored therein.

FIG. 5 shows an IC card memory space 50 of the RAM/ROM 103 of the IC card chip 10, and FIG. 6 an IC card terminal memory space 60 of the RAM 205 of the portable IC card terminal 20 (30). In order to meet the requirement of a plurality of applications, a plurality of applications (applications A and B) operating on basic software 51, 61 (operating systems, etc.) mounted in the spaces can be stored. Also, another service can be supplied by the free spaces 54, 64 by storing therein applications operating on the basic software.

Figure 7:
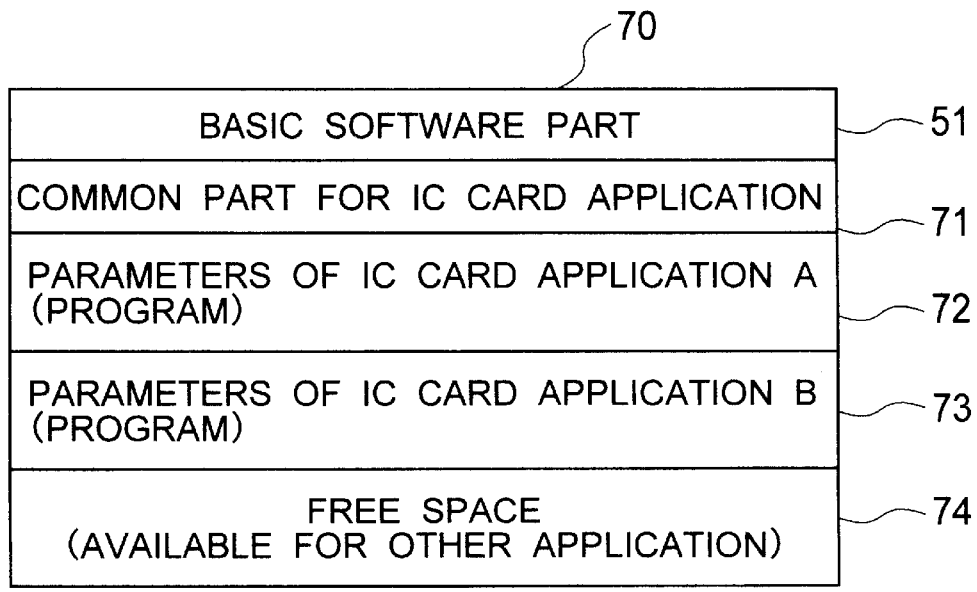
FIG. 7 is a diagram showing a configuration of the IC card memory space with a plurality of IC card applications stored therein.
Figure 8:
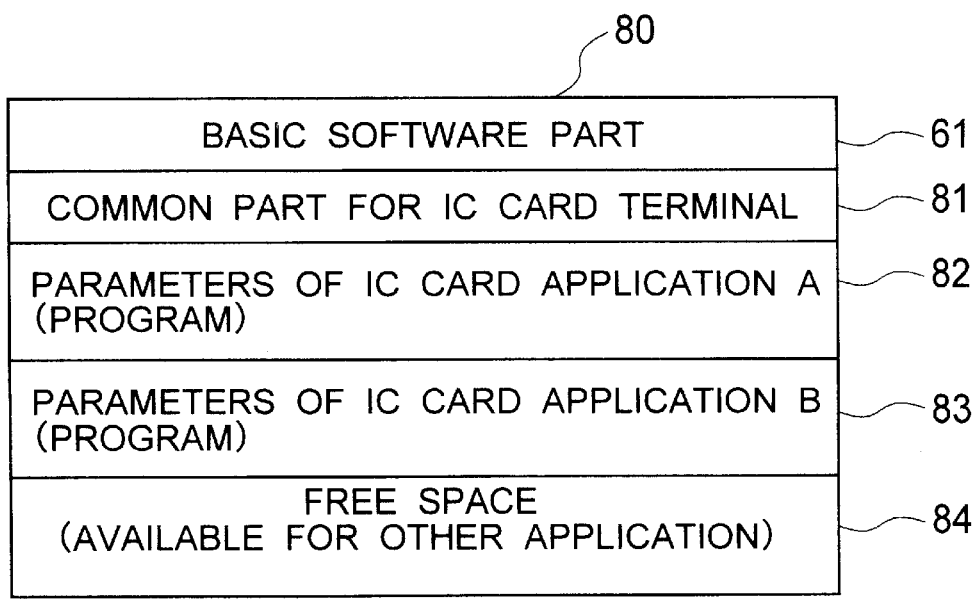
FIG. 8 is a diagram showing a configuration of the IC card terminal memory space with a plurality of IC card terminal applications stored therein.

FIGS. 7 and 8 show another form of the memory space in the case where the application operating on the basic software has a common part. In this case, in addition to the common application parts 71, 81, a plurality of applications can be stored by arranging information parameters corresponding to individual applications (such as applications A and B) or programs corresponding to individual applications (72, 73, 82, 83). For example, such a memory space is suitable for the following applications. They are associated with the case where the applications A, B have the function of managing and totalizing the history of the user services, a multipurpose spreadsheet routine can be provided as a common application part or a template is provided for storing the history as the parameter. As an alternative, a personal certification function of the IC card is provided to the common application part, and the applications A, B have a program corresponding to the respective services. The free spaces 74, 84 can store therein other application parameters, other programs or applications which, though lacking a common application part, operate on the same basic software.

In order to meet the requirement of the services offered by a plurality of business organizations with a single IC card, it is necessary to install the applications in the IC card held by the user. Also, in the case of the version-up of the applications, a corresponding version-up of the IC card applications is required. In this way, the business organization, in order to provide the services with an IC card, is required to have a mechanism for supplying an application to each IC card and a portable IC card terminal of the user.

Figure 9:
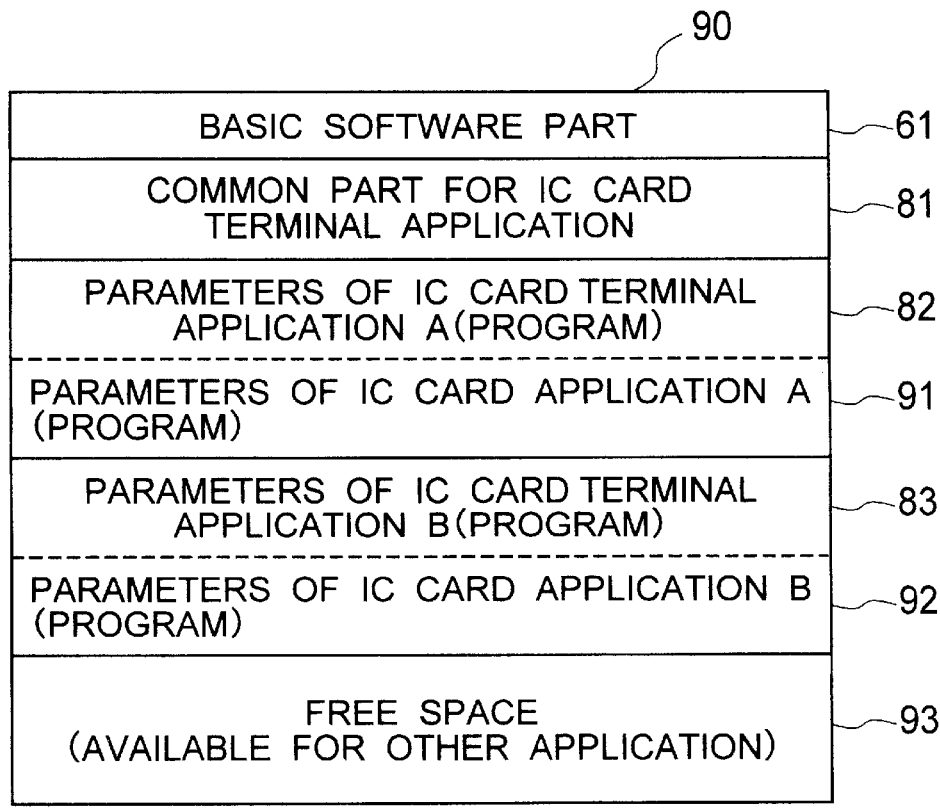
FIG. 9 is a diagram showing a configuration of the IC card terminal memory space with an IC card and an IC card terminal application stored in pair therein.

FIG. 9 shows a portable IC card terminal memory space 90 suitable for the purpose described above. The memory space 90 is for supplying the IC card with an IC card application (or a parameter) through a portable IC card terminal. IC card application parameters (programs) 91, 92 corresponding thereto are stored in the portable IC card terminal memory space 90 in addition to the basic software part 61, the common application part 81 and the IC card terminal application parameters (programs) 82, 83. The user connects the portable IC card to the network or the like and thus is supplied with an application (IC card/IC card terminal) from the business organization. The application thus supplied is stored in the IC card terminal memory space 90, and as the IC card application is transferred from the terminal to the IC card, the user can receive a new service from the business organization.

Figure 10:
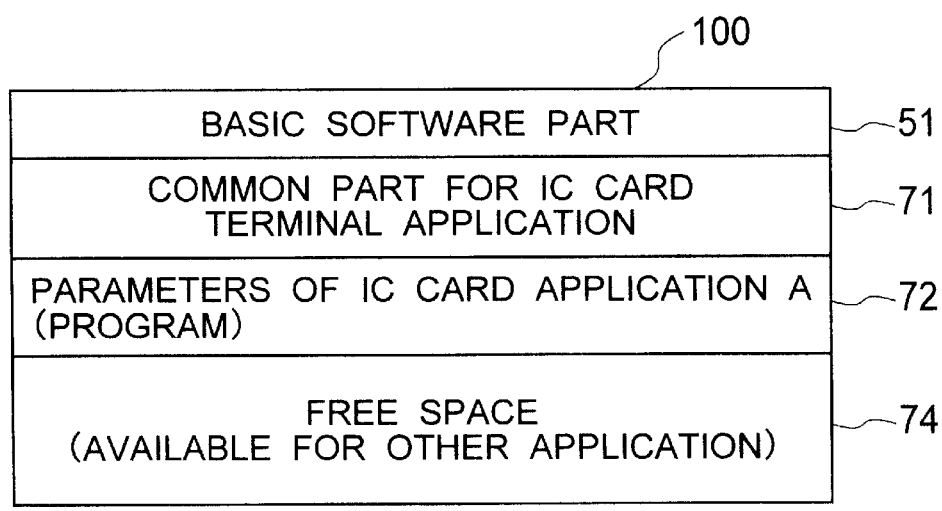
FIG. 10 is a diagram showing a configuration of the IC card memory space with an IC card and an IC card terminal application stored in pair therein.
Figure 11:
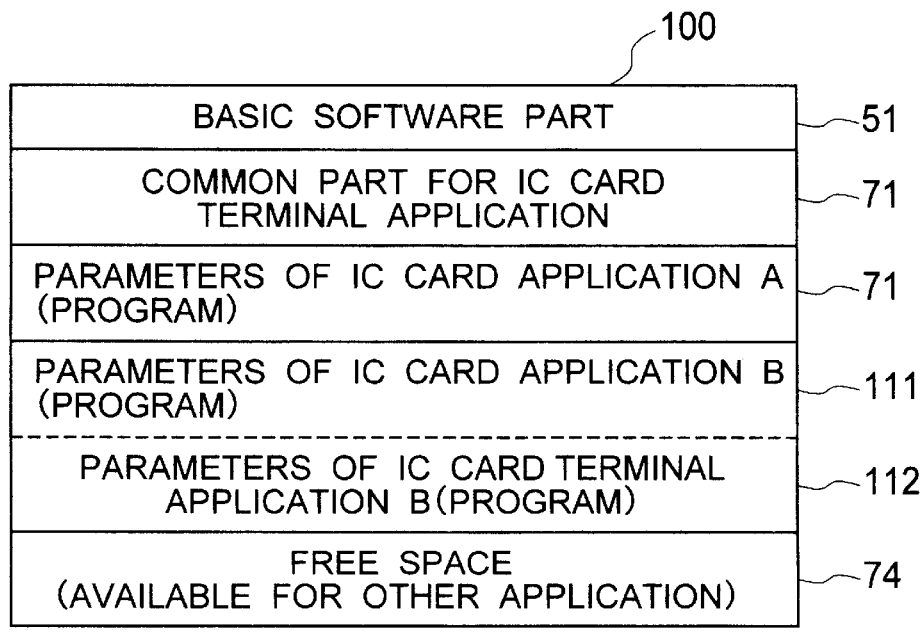
FIG. 11 is a diagram showing a configuration of the IC card memory space with an IC card and an IC card terminal application stored in pair therein.
Figure 12:
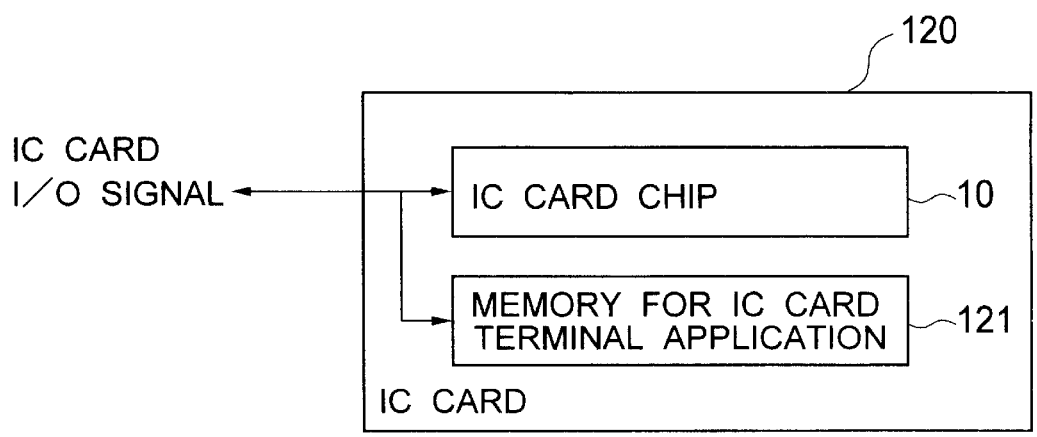
FIG. 12 is a diagram showing another configuration of the IC card chip.

FIGS. 10 and 11 are diagrams for explaining the memory space of an IC card in the reverse case where the IC card terminal application (or parameter) is supplied to the IC card terminal. FIG. 10 shows a memory space 100 of the IC card before a new application is written, in which only the application A is installed and the remaining memory space is available as a free space. This IC card is inserted into an IC card terminal of shop setting type or the like owned by a business organization, and a new application is written therein. In the process, the IC card terminal application is written as well as the IC card application. FIG. 11 shows the IC card memory space after being written. The new IC card application B and the corresponding IC card terminal application B are written in the memory space 100. In this case, the IC card may run short of memory. FIG. 12 shows a configuration of the IC card to meet such a situation. The memory shortage can be overcome by mounting the IC card terminal application storage memory chip 121 on the IC card. This IC card terminal application storage memory chip 121, unlike the RAM/ROM 102 in the IC card chip 10, is accessible from outside without the intermediary of the CPU 102 and therefore inferior in security. Nevertheless, it is considered that the required security can be obtained in view of the fact that only the encrypted IC card terminal application is stored in the memory chip 121 but personal information are not stored therein. By inserting this IC card into the portable IC card terminal, the portable IC card terminal reads the IC card terminal application B and writes it in its own memory space. By doing so, a new application can be easily installed in both the IC card and the IC card terminal.

Figures 13, 14:
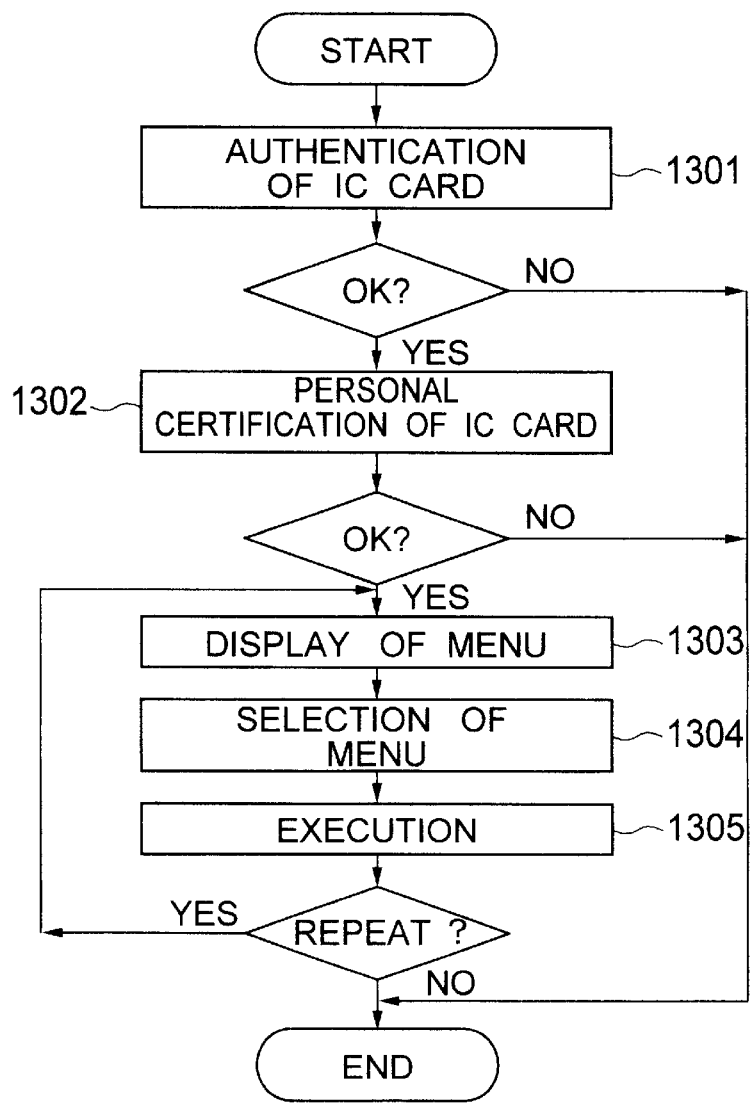
FIG. 13 is a diagram showing the flow of the process in an IC card terminal according to the invention.
FIG. 14 is a diagram showing a menu display screen of an IC card terminal according to the invention.

With reference to FIG. 13, an explanation will be given of the flow of the process for the portable IC card terminal. First, the IC card authentication process (step 1301) is executed. Step 1301 is the process for authenticating the mechanical and electrical legitimacy of the IC card mounted in the terminal. Once the mounted IC card is authenticated, the personal authentication process (step 1302) for the IC card is executed. Step 1002 is the process for authenticating the IC card holder as a legitimate register, and if he is a legitimate holder, the next process is executed. With the conventional IC card terminal, the desired application is only of one type, and therefore a predetermined process (such as withdrawal of electronic money) is executed. In the portable IC card terminal according to this embodiment, in contrast, a menu of the items next to be executed is displayed on a liquid crystal display (step 1303), a key entry is received from the user for selecting an operation (step 1304), and the process thus selected is executed (step 1305). FIG. 14 shows an example of menu on display. The user selects the process desired from the menu display screen 1401. By the way, the applications include those requiring strict personal authentication such as electronic money and those requiring no strict personal authentication such as entrance and exit management. Therefore, the menu display and selection (1303 to 1304) can be carried out prior to the personal authentication 1302 of the IC card. Such a personal authentication 1302 is performed only to the degree required by the application.

An explanation will be given of a detailed operation performed in the case where "execution of application" is selected from the menu select screen 1401. FIG. 15 shows a flow of the process for the portable IC card terminal and the IC card in the case where the execution of the application is selected. In the portable IC card terminal, an IC card terminal application list is prepared (step 1501), while at the same time preparing an IC card application list in the IC card (step 1502). After that, the IC card application list is sent from the IC card to the portable IC card terminal, and compared with each application list in the IC card terminal (step 1503). This list desirably includes the name and version of the application. As a result, there are three cases, i.e. all the applications of the IC card and those of the portable IC card terminal correspond to each other (in both the applications and the versions thereof) (condition A); an application not found in the portable IC card terminal is contained in the IC card (condition B); and an application not found in the IC card is contained in the portable IC card terminal (condition C). The condition B is associated with the case where the business organization has provided an application through the IC card; and the condition C is associated with the case in which the business organization has provided an application through an IC card terminal or the case in which the IC card application stored in the IC card is saved temporarily in the IC card terminal by the user.

The processing flow for the condition A is shown in FIG. 16. In the case where all the applications of the IC card correspond to those of the portable card terminal, the process is not required for version-up of the applications of the IC card and the portable IC card terminal. Therefore, the user selects the desired application (step 1601), and executes the selected application (step 1602). In the process, if required, the execution of the application can be entrusted also to the IC card.

Figure 17:
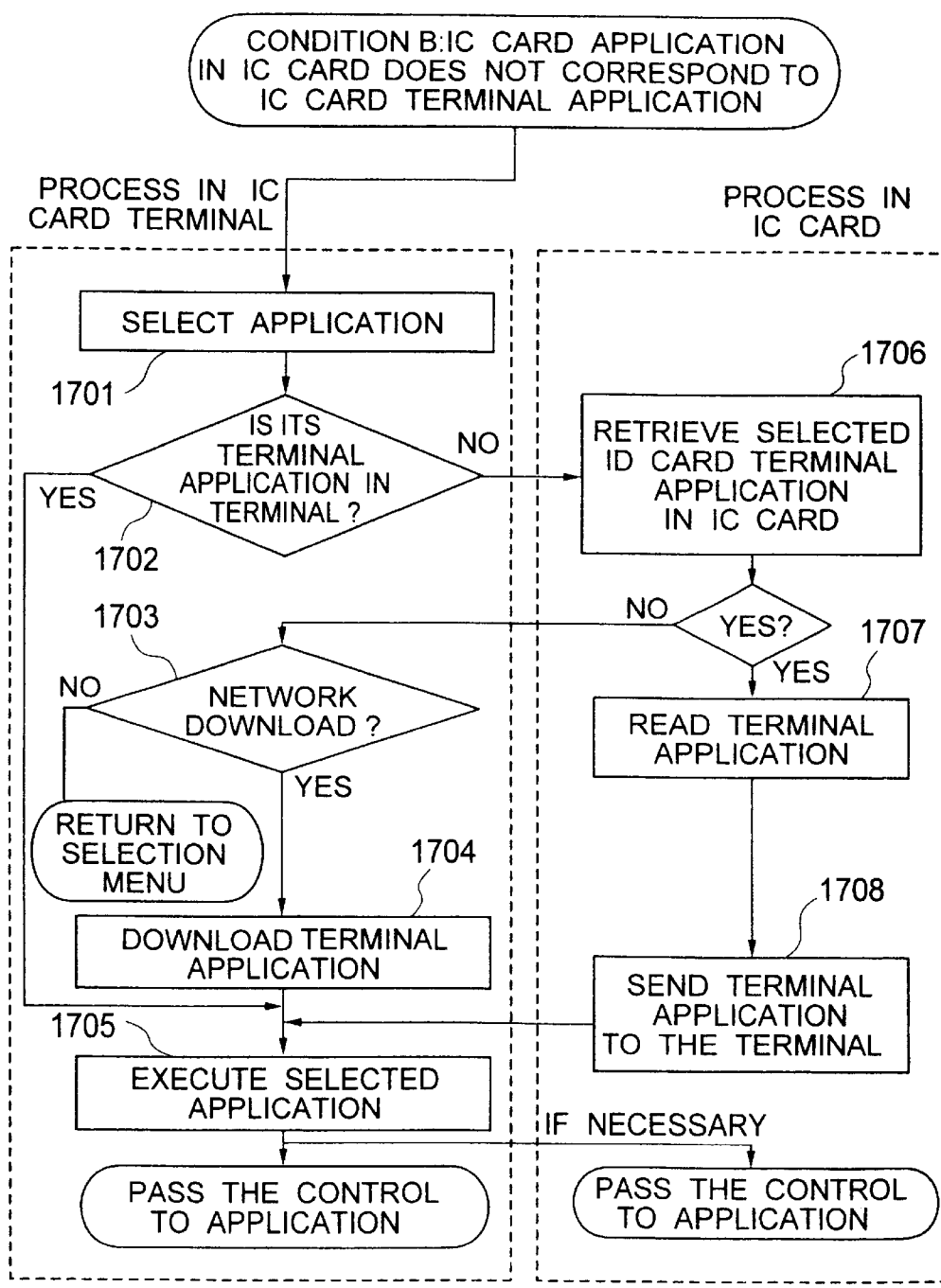
FIG. 17 is a diagram showing the flow of a process (condition B) of executing an application in an IC card terminal according to the invention.

The processing flow for the condition B is shown in FIG. 17. In the case where the selected application (step 1701) is not found in the IC card terminal (step 1702), the IC card is searched for the selected IC card terminal application (step 1706). In the case where the selected IC card terminal application is contained in the IC card, the terminal application is read from the IC card (step 1707), and transferred to the IC card terminal (step 1708) and installed therein. Otherwise, the user is inquired as to whether the terminal application is to be downloaded through the network or not (step 1703). Upon receipt of the user approval, the required terminal application is downloaded through the network (step 1704). In this case, it is of course necessary that the portable IC card terminal is accessible to the supplier organization (business organization) of he application through the LAN or the telephone line. The terminal application, after being downloaded through the network, is installed and executed (step 1705). At the same time, the process can be entrusted to the IC card, if required.

Figure 18:
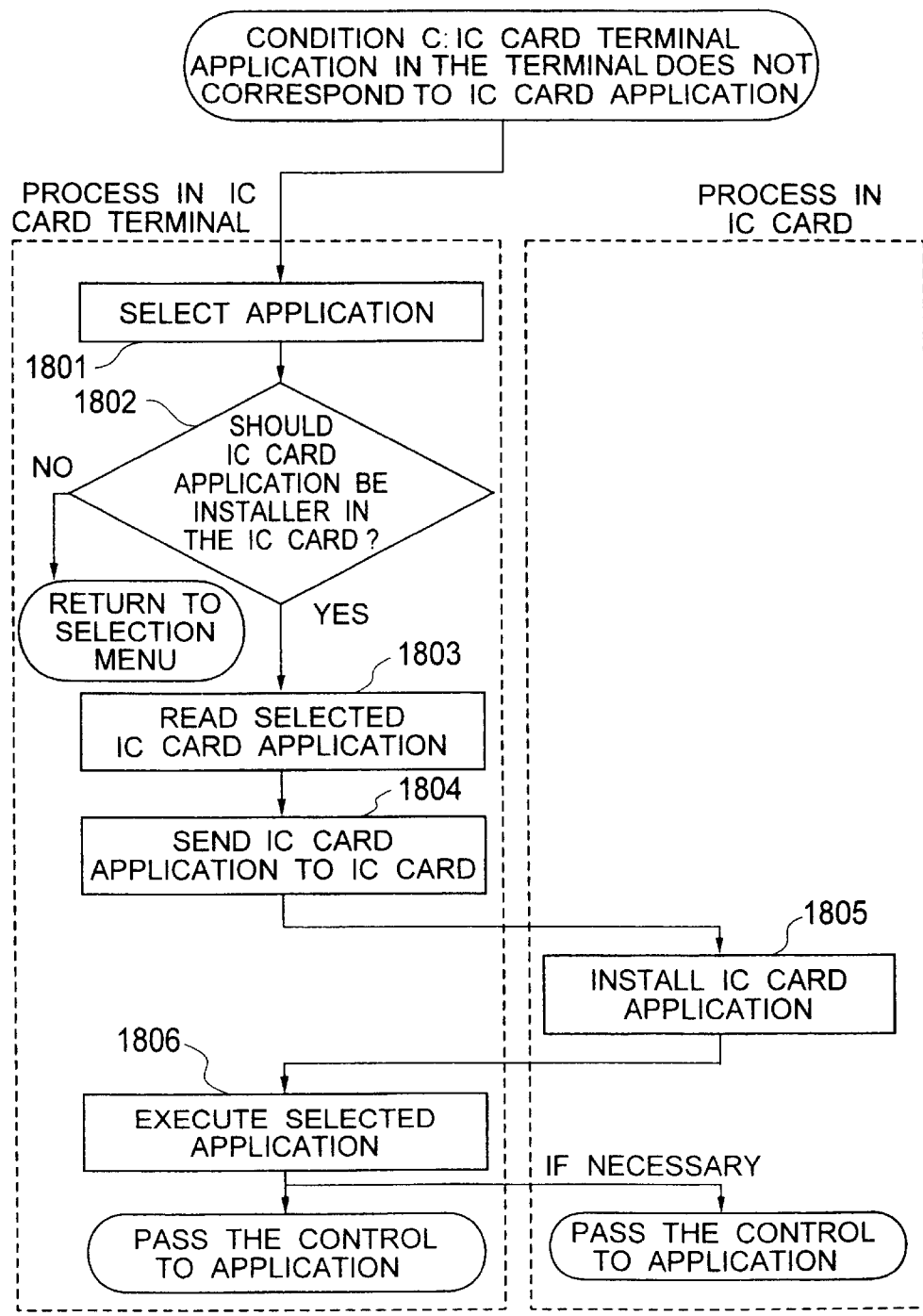
FIG. 18 is a diagram showing the flow of a process (condition C) of executing an application in an IC card terminal according to the invention.

The processing flow for the condition C is shown in FIG. 18. In the case of the condition C, the user is inquired as to whether the IC card application is installed in the IC card or not (step 1802), and then the selected application is read from the IC card terminal (step 1803), and transferred to the IC card (step 1804). Then, the application is installed in the IC card (step 1805), and the selected application is executed (step 1806). Further, if required, the process can be entrusted also to the IC card.

By the way, in the case of the conditions B and C, the sum of the IC card application list and the IC card terminal application list is indicated to the user to receive a select request from him.

The foregoing is the description of the process executed in the case of an incoincidence between the portable IC card terminal and the application stored in the IC card during the execution of the application between the portable IC card terminal and the IC card. By executing this process, the IC card user can realize the execution of the application in the portable IC card terminal and the IC card unconsciously.

Now, an explanation will be given of a detailed operation in the case where the "version-up of application" is selected from the menu selecting screen shown in FIG. 14. In this case, the version-up means the process of changing a version of an application.

Figure 19:
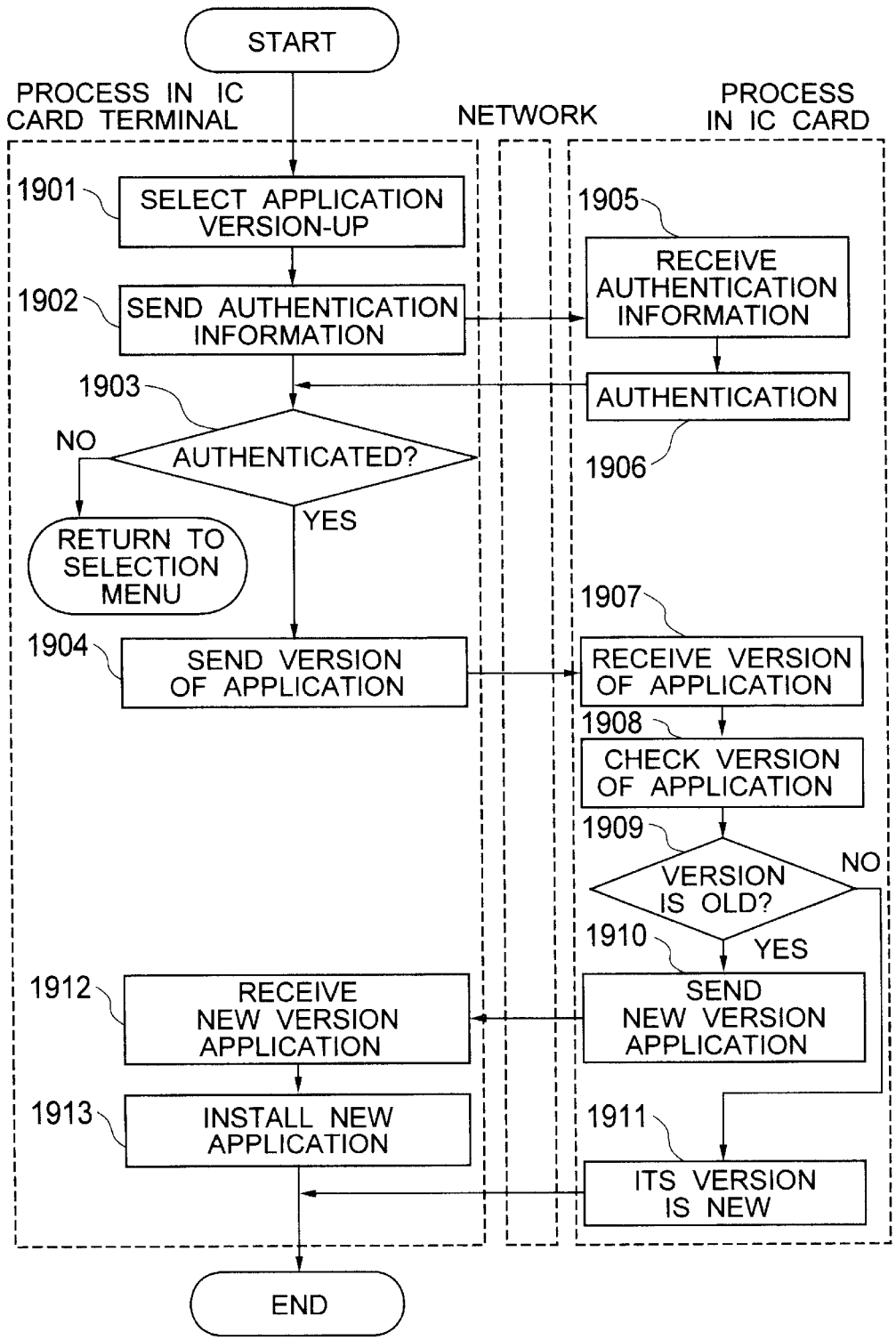
FIG. 19 is a diagram showing the flow of the process of version-up of an application in an IC card terminal according to the invention through a network.

FIG. 19 shows a flow for version-up of an application. In the case where the user selects an application for version-up (step 1901), the host processing unit of the supplier organization (business organization) of the application holding the latest IC card terminal application is accessed through the network such as the LAN or the telephone network and the authentication information is transmitted thereto (step 1902). This authentication information is the information for making sure that the IC card terminal connected is not an illegitimate one and if required, a fee is charged on the downloading of the application. This authentication process can be realized by a generally known procedure such as a password. The host processing unit checks the authentication information thus sent (step 1905), and if authenticated (step 1906), notifies the IC card terminal of the successful authentication. The IC card terminal transmits the version of the application in store to the host processing unit (step 1904). The host processing unit checks the version sent thereto (step 1908), and if the application is an old version (step 1909), sends an application of new version (step 1910), which is installed by the IC card terminal (step 1913). In the case where the application in store is the latest version, the IC card is informed that the version has no problem (step 1911).

The received application is desirably a pair of an IC card application and an IC card terminal application. The received IC card application is installed in the IC card in accordance with the flow shown in FIGS. 15 and 18.

Figure 20:
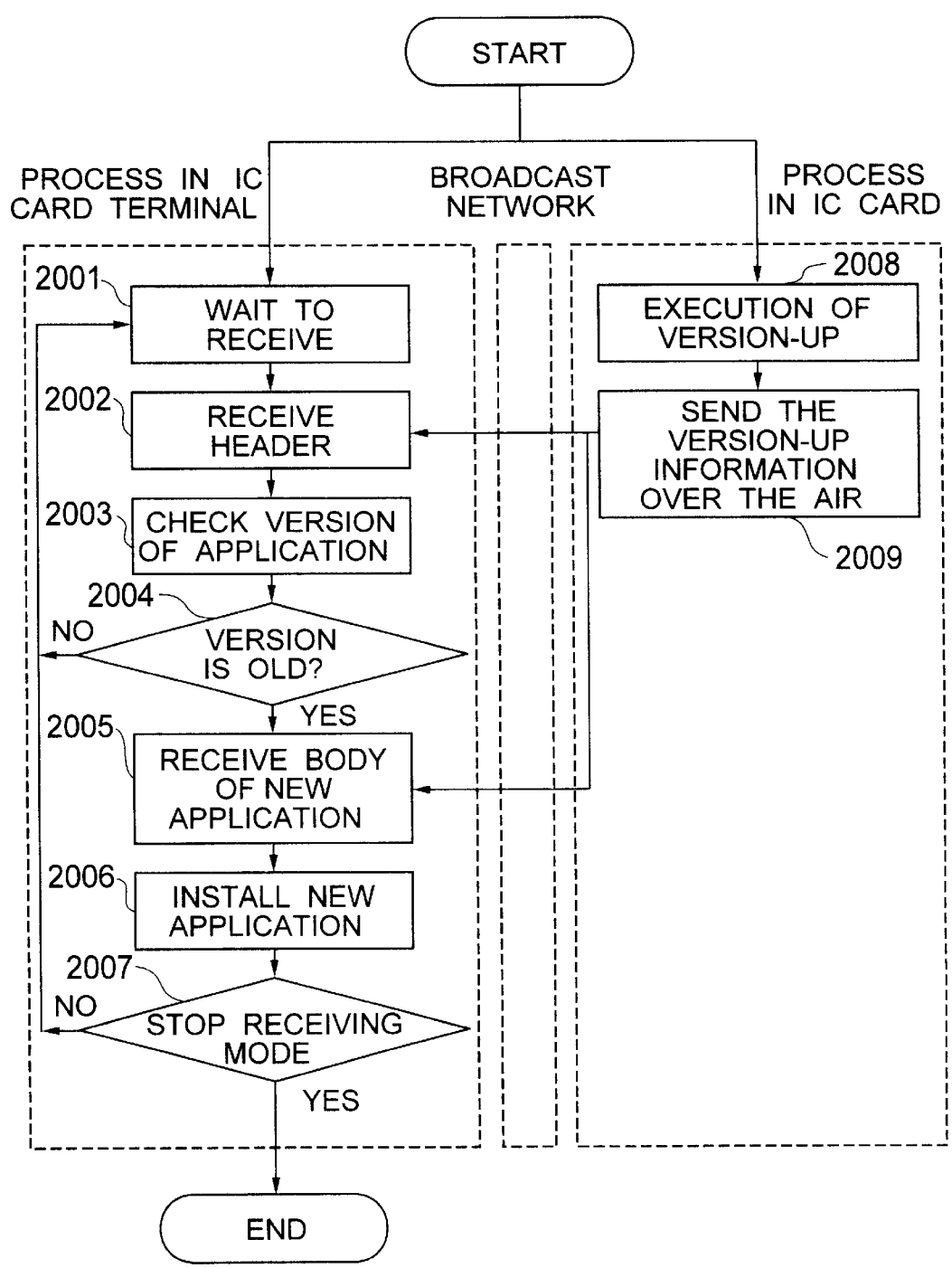
FIG. 20 is a diagram showing the flow of the process of version-up of an application in an IC card terminal according to the invention through a broadcasting.

The flow shown in FIG. 20 is another example of executing the version-up of the application. A satellite broadcast receiving unit is mounted in the portable IC card terminal 30 according to this embodiment as shown in FIG. 3. The application is periodically broadcast from the satellite, and upon receipt thereof, the version-up of the application is effected. As a form of business in this case, a plurality of business organizations are assumed to share one channel, through which the applications supplied from them are transmitted.

In the case where the version-up of an application is selected by the user, the portable IC card terminal 30 enters the receiving mode (step 2001). In receiving mode, the header of the application broadcast (step 2009) from the host processing unit is monitored. The file name, version, property, file size and the compress method of the application are recorded in the header. The terminal, upon receipt of the header of the application installed (step 2002), checks the version of the application recorded in the header (step 2003). After version check, if the application installed in the portable IC card terminal is old (step 2004), the new application program proper is received (step 2005) and installed (step 2006). In the case where the receiving mode is continued, the process returns to step 2001 (step 2007) ready for receiving. By this processing flow, the user of the IC card terminal can always use the latest version of the application without being conscious of the age of the version of the application.

In this case, too, the received application is desirably a pair of the IC card application and the IC card terminal application. The IC card terminal memory space is configured to store the IC card application parameters, in addition to the basic software, the common application part and each IC card terminal application parameter, as shown in FIG. 9, thereby facilitating the version-up of the IC card application.

Figure 21:
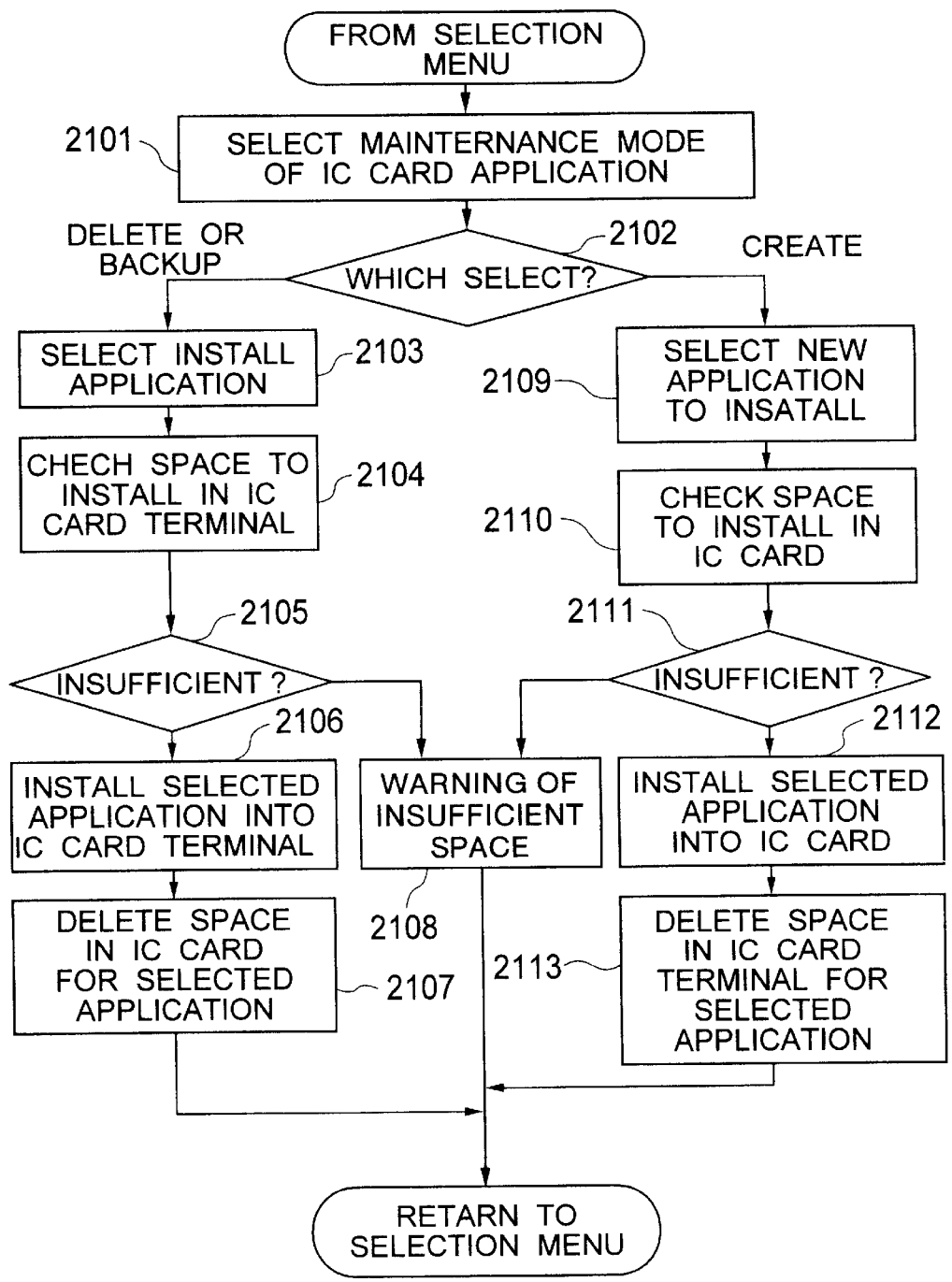
FIG. 21 is a diagram showing the flow of the maintenance process for an application in an IC card terminal according to the invention.
Figure 22:
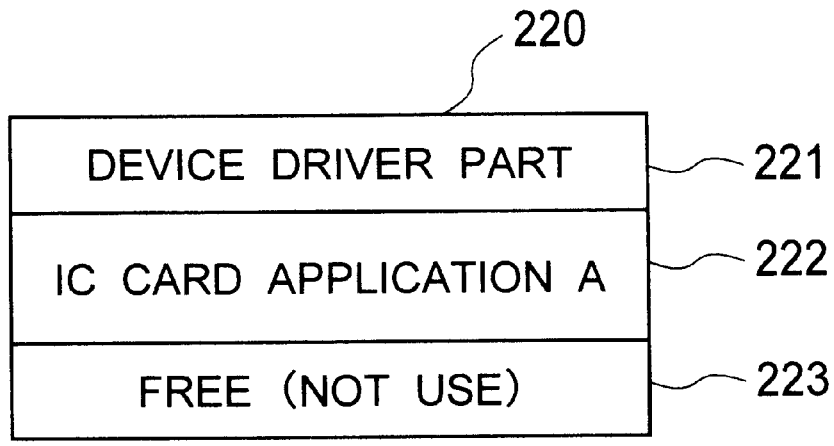
FIG. 22 is a diagram showing a conventional configuration of an IC card memory space.
Figure 23:
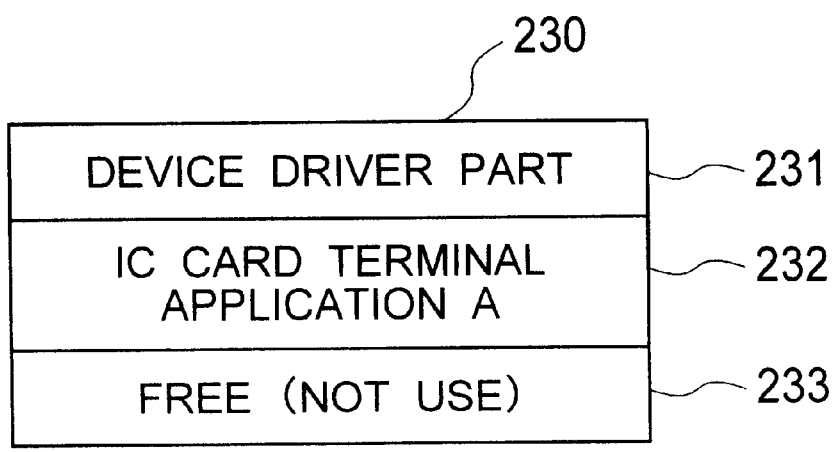
FIG. 23 is a diagram showing a conventional configuration of an IC card terminal memory space.

Now, with reference to FIG. 21, an explanation will be given of a detailed operation in the case where the "application maintenance" has been selected from the menu select screen shown in FIG. 14 at the portable IC card terminal The application maintenance indicates the process of newly loading a required application, deleting the unrequired application, or saving the application not required for the time being but of which the deletion is not desired. By the way, an application maintenance means the maintenance of two types of application including the IC card terminal application on IC card terminal side and the IC card application on IC card side. The maintenance of the IC card terminal application is carried out by the execution or version-up of the application described above, and therefore only the maintenance of the IC card application will be explained below.

The user selects either "write anew" or "delete (save)" of the IC card application (step 2102). First, an explanation will be given of the flow for saving the IC card application from the IC card to the IC card terminal. The user selects the application to be saved (step 2103), and the IC card terminal checks the capacity of the storage area (step 2104). In the case where the capacity is insufficient, the user is warned of the shortage (step 2108), and the process is terminated without doing anything. In the case where there is any capacity required, the selected IC card application is stored in the IC card terminal (step 2106). After that, the storage area of the selected IC card application is erased in the IC card (step 2107).

Now, an explanation will be given of the flow for newly writing the IC card application from the IC card terminal to the IC card. The user selects the application to be read (step 2109), and the IC card to be read checks the capacity of the storage area (step 2110). In the case where the capacity is insufficient, the user is warned against it (step 2108) and terminates the process without executing any thing. In the case where the required capacity is available, on the other hand, the selected IC card application is stored into the IC card (step 2112). After that, the IC card terminal erases the storage area of the IC card application selected (step 2113).

INDUSTRIAL APPLICABILITY

As described above, with the portable IC card terminal according to the invention, the maintenance such as the registration, confirmation and erasure of the application on the IC card can be easily carried out for the IC card with a plurality of applications mounted therein.

What is claimed is:

1. An IC card terminal comprising a memory in which IC card terminal applications are stored, a CPU for executing the IC card terminal applications stored in said memory and an I/O capable of being connected to an outside network, wherein:

each of said IC card terminal applications is of the type including a common IC card terminal application part shared by the IC card terminal applications and an IC card terminal application parameter part unique to the application, and each of IC card applications corresponding to one of said IC card terminal applications and being stored in an IC card cooperating with said IC card terminal is of the type including a common IC card application part shared by the IC card applications and an IC card application parameter part unique to the applications, the IC card terminal being capable of receiving an IC card terminal application parameter part through said outside network;

said memory has a first area for storing a common IC card terminal application part, a second area for storing IC card terminal application parameter parts of said IC card terminal applications, and a third area for storing an IC card application parameter part corresponding to one of said IC card terminal applications;

wherein said IC card terminal compares said IC card terminal application parameter parts with IC card application parameter parts in the IC card; and if said IC card application parameter part corresponding to one of said IC card terminal applications is not found in said IC card, said IC card application parameter part which is not found in said IC card is transferred to said IC card from said IC card terminal.

2. An IC card having an IC card chip mounted thereon, wherein:

said IC card chip includes a memory in which IC card applications are stored, a CPU for executing the IC card applications stored in said memory and an I/O for exchanging signals with an IC card terminal;

each of said IC card applications is of the type including a common IC card terminal application part shared by the IC card applications and an IC card terminal application parameter part unique to the application, and each of IC card terminal applications corresponding to one of said IC card applications stored in an IC card terminal cooperating with said IC card is of the type a common IC card terminal application part shared by the IC card terminal applications and an IC card terminal application parameter part unique to the application, said IC card being capable of receiving an IC card application parameter part from said IC card terminal through said I/O;

said memory has a first area for storing a common IC card application part, a second area for storing IC card application parameter parts of said IC card applications, and a third area for storing an IC card terminal application parameter part corresponding to one of said IC card applications;

wherein said IC card terminal compares said IC card terminal application parameter parts with IC card application parameter parts in said IC card; and if said IC card terminal application parameter part corresponding to one of said IC card applications is not found in said IC card, said IC card terminal application parameter part which is not found in said IC card is transferred to said IC card from said IC card terminal.

3. An IC card as described in claim 2 further comprising an external memory for storing said IC card terminal application parameter part.

4. A method of installing an IC card terminal application into an IC card terminal having a memory, an IC card I/O for exchanging information with an IC card having stored therein pairs of an IC card application parameter part and an IC card terminal application part and a common IC card terminal application part shared by the IC card application parts, an input device for inputting commands to the IC card terminal, and an output device, wherein said memory comprises a first area for storing a common IC card terminal application part shared by said IC card application parts, a second area for storing said IC card terminal application parts, and a third area for storing an IC card application corresponding to one of said IC card terminal application parts, the method comprising the steps of:

receiving information on names of the IC card applications stored in said IC card from said IC card through said IC card I/O;

displaying names of the IC card terminal applications parts stored in said memory and the names of said IC card applications parts on said output device;

selecting one of the displayed names of the applications parts by way of said input device;

comparing said IC card terminal application parameter parts with said IC card application parameter parts; and in the case wherein an IC card terminal application part represented by said selected application name is stored in said IC card but not in said memory, transferring said selected IC card terminal application part represented by said name through the IC card I/O from said IC card to said IC card terminal for storage in said memory.

5. A method of installing an IC card terminal application as described in claim 4, wherein:

said IC card terminal has an outside I/O capable of being connected to an outside network; and in the case where an IC card terminal application stored in neither said memory nor said IC card is needed, said IC card terminal application is downloaded from said outside network through said outside I/O.

* * * * *